Figure 1:
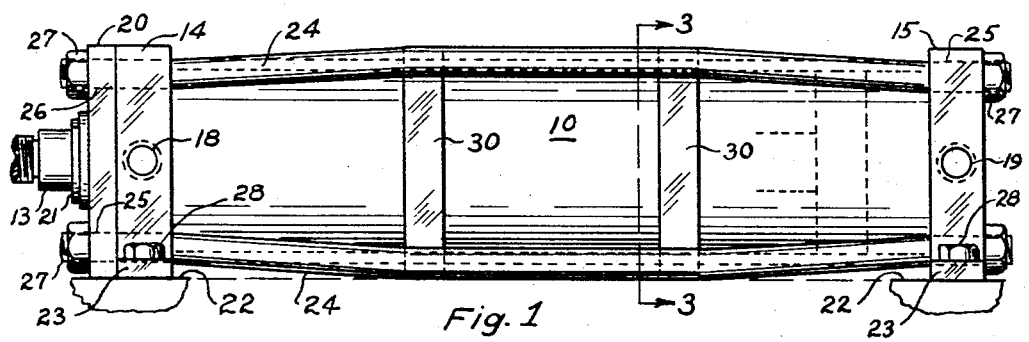

Dec. 5, 1961    O. J. MAHA ET AL    3,011,844
FLUID PRESSURE CYLINDER
Filed Dec. 22, 1958

INVENTORS
OTTO J. MAHA
ZDENEK J. LANSKY
BY John N. Wolfram
ATTORNEY

United States Patent Office 3,011,844
Patented Dec. 5, 1961

3,011,844
FLUID PRESSURE CYLINDER
Otto J. Maha, Chicago, and Zdenek J. Lansky, North Riverside, Ill., assignors to Parker-Hannifin Corporation, Cleveland, Ohio, a corporation of Ohio
Filed Dec. 22, 1958, Ser. No. 782,109
14 Claims. (Cl. 309—2)

This invention relates to fluid pressure cylinders and more particularly to a means for strengthening the cylinder tube against forces tending to bend or buckle the tube.

It is common practice to use circumferentially spaced tie rods for holding cylinder heads in place on the cylinder tube, the tie rods being external of the tube and extending axially therealong from one head to another. Tensioning of the tie rods imposes an axial compression load on the cylinder tube which may result in bending stresses on the tube, particularly when there is little or no fluid pressure within the cylinder as it is at this time that the rods impose the greatest axial compression load on the tube. Bending stresses on the tube may also result from side loads on the cylinder or piston rod.

Bending is of particular concern when the length of the cylinder is many times the diameter. For example, cylinders of two inch bore may be as long as fourteen feet and it is readily apparent that side forces or uneven tie rod tension will tend to bend the cylinder tube. Side forces may also tend to "jackknife" the cylinder tube and piston when the piston rod is extended.

Even with slight bending of the cylinder tube there will be undue wear on the piston and piston rod packings, plus excessive wear and possible scoring of the bearing surfaces of the piston and cylinder wall as well as between the piston rod and the cylinder head assembly through which the rod extends. If severe enough, the bending will cause sticking or jamming of the piston in the cylinder, or even result in buckling and destruction of the cylinder.

The prevent invention has for an object to utilize cylinder tie rods in a novel manner for strengthening the cylinder tube against bending and attains this object by spreading or bowing the rods outwardly intermediate their ends. It is apparent that such spreading results in a truss-type support which contributes materially in resisting forces tending to bend the cylinder tube.

Another object is to spread the tie rods a maximum extent for achieving maximum rigidity and support for the cylinder tube without having the rods or spreading means project laterally beyond the end view outline of the cylinder heads. This avoids exceeding of the cylinder head end view clearance dimensions by the rods or spreader and also avoids interference by the latter elements with the mounting of the cylinder heads against a flat surface when installing the cylinder in its place of use.

It is another object to provide a tie rod spreader in which no portion of the spreader adjacent the tie rods will project radially beyond the tie rods whereby the tie rods may be spread a maximum amount within minimum lateral envelope dimensions for the spreader and tie rods.

It is another object to provide a spreader for the rods which permits the rods to be readily and easily assembled to the cylinder.

It is another object to provide a spreader for the tie rods which locates the intermediate portion of the rods in fixed circumferential positions about the cylinder tube.

It is another object of the invention to provide a means for locating the spreader in a fixed longitudinal position on the cylinder tube.

It is another object to spread the tie rods intermediate their ends a maximum extent within limiting lateral envelope dimensions whereby accurate centering of the spreader means is less critical.

Figures 2, 3, 5:
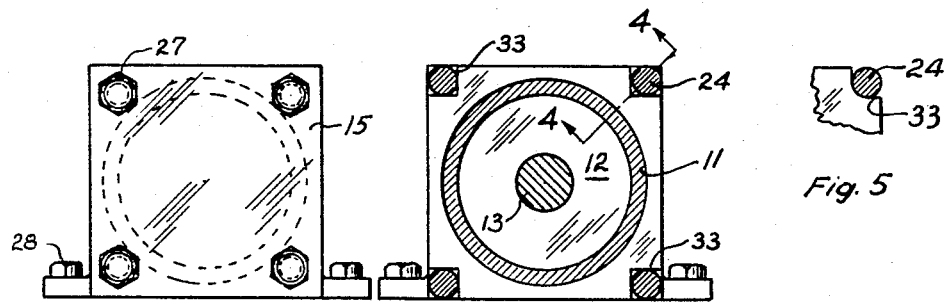
Figures 4, 6:
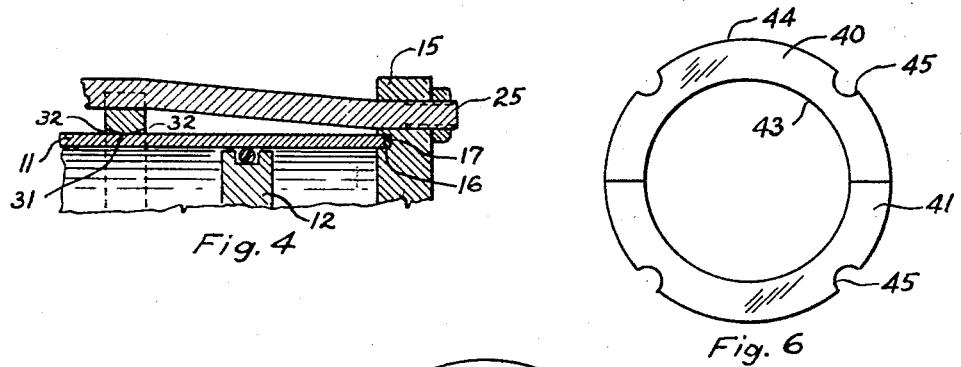
Figures 7, 8:
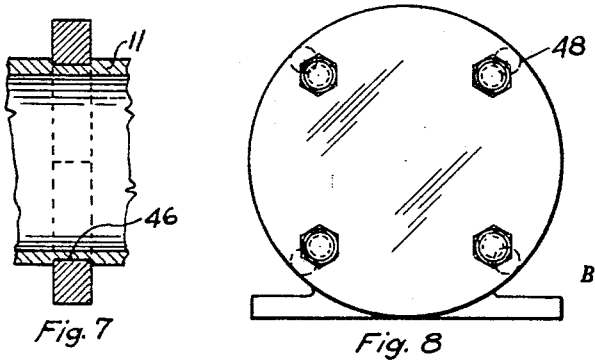

Other objects will be apparent from a detailed description of the invention and from the drawings, in which:

FIG. 1 is a side view of a fluid pressure cylinder utilizing a pair of spaced tie rod spreaders;
FIG. 2 is an end view of the cylinder assembly;
FIG. 3 is a cross section view along 3—3 of FIG. 1;
FIG. 4 is a fragmentary sectional view taken along 4—4 of FIG. 3;
FIG. 5 is a fragmentary view showing an optional shape for the tie rod receiving notches of the spreader;
FIG. 6 is an end view of an optional form of the spreader, comprising two semi-circular members;
FIG. 7 is a fragmentary cross sectional view showing a method of locating the optional form of spreader against longitudinal displacement on the cylinder tube;
FIG. 8 is an end view of a cylinder equipped with round cylinder heads.

The cylinder assembly 10 is of conventional form and comprises a cylindrical tube 11 in which a piston 12 is mounted for reciprocation therein, the piston 12 being carried by a piston rod 13 which extends from one end of the cylinder. The cylinder tube 11 is closed at each end by heads 14 and 15 which have annular grooves as shown at 16 in FIG. 4 for reciving a suitable packing 17 and the adjacent end of the cylinder tube. Each head has a port 18—19 through which motive fluid is introduced and exhausted from the cylinder in the well known manner.

A plate 20 is provided adjacent the head 14 for receiving a packing assembly 21 for sealing the piston rod 13.

The heads 14 and 15 are preferably of square shape, as viewed from the end of the cylinder, although they may be of other shape. Also, the heads are preferably of the same size in end view and with the corresponding sides of the end view outline, whether square or of other shape, aligned in common planes. This permits the heads to be mounted on a flat bed 22, fragmentarily shown in FIG. 1, and also results in the minimum lateral clearance dimensions for the end view envelope outline of the cylinder. The heads 14 and 15 may be securely clamped against the bed 22 by means of lugs 23, welded to the heads, and bolts 28.

The heads 14 and 15, and plate 20, are held in place by a plurality of tie rods 24 which pass through holes 25 in the heads 14 and 15 and corresponding holes 26 through the plate 20. For larger diameter cylinders the plate 20 is of smaller end view size than the head 14, in which case it may be secured thereto by separate bolts or screws and the tie rods will not pass through the plate 20. The tie rods are secured at their ends by nuts 27. Tightening of the latter clamps the heads firmly against the ends of the tube 11 and compresses the packings 17 so as to make the joints leak proof.

The tie rods are preferably equally spaced about the circumference of the cylinder tube, although in certain instances it may be desirable to vary the circumferential spacing between adjacent pairs of tie rods. Also, the holes 25 through the heads are placed as close as practical to the outer diametral surface of the cylinder tube and preferably at equal, fixed radial distances from the longitudinal axis of the tube 11. The holes 25 have their centers on the diagonals of the square end view outline, as shown in FIG. 2, or in other words, the centers of the holes are on radial lines extending from the longitudinal axis of the head, which axis is coincidental with the axis of the tube, to the intersection of the adjacent sides of the square.

Mounted on the cylindrical tube 11 are a pair of identical spreader plates 30. The spreaders are of generally square end view outline with the size of the square the same as, or somewhat smaller than that of the heads 14 and 15, and with the sides of the square aligned with the sides of the heads 14 and 15 so that no part of the spreaders 30 will project laterally beyond the end view outline of the heads 14 and 15.

The spreaders have a central opening 31 slightly larger than the outer diameter of the tube 11 so that they may be easily slipped over the tube and moved to their proper position. However, the opening fits the tube closely enough to adequately center the spreader on the tube so that the tie rods will be spread substantially uniformly. A diametral clearance of about .008 to .013 inch gives good results in this regard. The opening 31 is chamfered at both ends as at 32 to facilitate entry over the tube 11 from either end.

The spreaders 30 have cutouts or notches 33 at each corner of the square for receiving the tie rods 24. These notches may be of rectangular shape, as shown in FIG. 3, or they may have straight sides and curved bottoms as shown in FIG. 5, or they may be of other shape. In any case, it is preferable that they be centered on the diagonals of the square so that their centers will be in the same radial planes as the centers of the corresponding holes 25 in the heads 14 and 15.

The spreaders 30 serve to spread the rods radially outwardly so that the radial distance from the rod to the longitudinal axis of the cylinder is greater at a point intermediate the ends of the cylinder tube than at a point at the ends of the tube, that is, at a point adjacent the junctures of the tube and heads. Spreading of the rods in this manner furnishes a truss-like support to resist buckling or bending of the tube.

It it apparent that the more the rods are spread the greater will be the support against bending of the cylinder tube 11. For this reason it is highly desirable to spread the rods a maximum extent. On the other hand, it is also desirable that neither the rods nor the spreaders project beyond the end view outline of the heads 14 and 15 since they would then interfere with simultaneous flat seating of the heads 14 and 15 on the flat mounting surface 22 and also would require greater end view clearance dimensions than the heads.

To achieve such maximum spreading of the rods within the end view envelope dimensions of the heads, the notches 33 are shaped and located so that they will spread and hold the rods 24 outwardly a fixed radial distance beyond the ends of the rods with the rods at their position of maximum spread being tangent to longitudinal planes passing through corresponding adjacent sides of the heads 14 and 15. In this way, the rods are spread a maximum amount without projecting laterally beyond the end view outline of the heads. Also, the outwardly open form of the notches 33 permits the spreaders to be dimensioned so that no portion of the spreader will project radially beyond the spread portion of the tie rod thus permitting maximum spreading of the tie rods within minimum lateral envelope dimensions for the rods and spreader. Furthermore, the open notches facilitate assembly of the tie rods to the cylinder tube since the rods can enter the grooves by sideward or lateral motion.

The optional segmental form of spreader illustrated in FIGS. 6 and 7, comprises a pair of members 40 and 41, each having a semicircular bore 43. The external surfaces 44 are so illustrated as being semicircular also, but they may be of other shape. In any case, the external surfaces 44 are so shaped and dimensioned that no part thereof will project laterally beyond the end view outline of the heads 14 and 15 when the spreader members 40 and 41 are properly positioned on the tube 11.

Although both the FIG. 3 and FIG. 6 forms of spreaders will be held firmly in a longitudinal position along the tube 11 by frictional contact with the tie rods, it is preferable, when using the segmental spreader of FIG. 6, to guard against accidental longitudinal separation of the segments by mounting them in an annular groove 46 in the tube 11. In such case, the bore portions 43 are of a diameter to closely fit the bottom of the groove 46.

The spreader members 40 and 41 are provided with notches 45 for receiving the tie rods. As in the case of the spreaders 30, the notches are so dimensioned and located that when the members 40 and 41 are in their proper position on the tube 11, the notches will spread the rods outwardly to a position where the rods, at their point of maximum spread, will be tangent to the planes passing through corresponding adjacent sides of the heads 14 and 15 and with the center of the spread portion of each rod remaining in a radial plane passing through the longitudinal axis of the cylinder assembly and the respective rod ends.

When cylinder heads of circular end view outline are used, the rods are spread so that at their point of maximum spread they will be tangent to the circular end view outline, as shown at 48 in FIG. 8.

FIG. 1 shows two spreaders 30 mounted on the cylinder tube. For shorter cylinders one spreader may be used and for longer cylinders additional spreaders may be provided. It has been found that good results are obtained when the number of spreaders to be used is determined from the formula:

$$N = \frac{S}{24B} - 1$$

where:

$N$ = number of spreaders to closest whole number.
$S$ = stroke of cylinder in inches.
$B$ = bore of cylinder in inches.

Thus for a cylinder of 2 inch bore and 10 feet in length, two spreaders, equally spaced between the heads, should be provided.

Although a cylinder assembly with four tie rods has been illustrated, it is apparent that a different number may be used. The main consideration is that the tie rods do not at any point extend laterally beyond the end view outline of the heads, and particularly not laterally beyond that portion of the heads which is to contact the surface upon which the cylinder is to be mounted.

It is obvious that other changes may be made in detail embodiments of the invention without departing from the scope of the claims.

We claim:

1. A fluid pressure cylinder assembly comprising a cylindrical tube, tube closure heads of polygonal end view outline and of corresponding end view dimensions mounted on the ends of the tube for closing the same, said heads at corners formed by the intersection of adjacent sides of said polygons extending radially beyond said tube, a plurality of tie rods exterior of the tube having their ends attached to respective ones of said corners for holding said heads in position on said tube, said rod ends at the juncture of said heads and cylinder tube being spaced laterally inward of the respective adjacent sides of said polygons, a rod spreader plate loosely mounted on said tube between said heads and supporting an intermediate portion of said rods in a position substantially tangent to longitudinal planes passing through said respective adjacent sides of said polygons, said spreader means having no portion extending radially beyond the end view outline of said heads and having outwardly open notches for receiving and circumferentially locating said intermediate portions of the rods.

2. A fluid pressure cylinder assembly comprising a cylindrical tube, a head mounted on each end of the tube, a plurality of tie rods exterior of the tube and extending axially therealong, said rods being attached to said heads and having rod end portions adjacent said tube ends, rod spreader means on said tube longitudinally inward of said heads and supporting an intermediate portion of said rods in a position radially outward of said rod end portions, said intermediate portions of at least one of said rods being tangent to at least one longitudinal plane which is tangent to at least a portion of the end view outline of one of said heads.

3. A fluid pressure cylinder assembly in accordance with claim 2 in which said intermediate portions of all of said rods project laterally no farther than the end view outline of either of said heads.

4. A fluid pressure cylinder assembly in accordance with claim 2 in which there is a plurality of spreader means on said tube, each of which supports an intermediate portion of said tie rods in the manner stated in claim 2.

5. A fluid pressure cylinder assembly in accordance with claim 2 in which said heads encircle said rod ends at the junctures of said heads and tube and said spreader means has outwardly open notches for receiving said intermediate portions of said rods and in which said notches are open sufficiently to permit said rods to enter said notches from a lateral direction.

6. A fluid pressure cylinder assembly comprising a cylindrical tube, tube closure heads of polygonal end view outline and of corresponding end view dimensions mounted on the ends of the tube for closing the same, a plurality of tie rods exterior of the tube, each rod having its ends attached to said heads near the intersection of a respective pair of adjacent sides of said polygons but spaced laterally inward of said respective sides at the junctures of said heads and tube, a rod spreader means on said tube between said heads and supporting an intermediate portion of said rods in a position tangent to longitudinal planes passing through said respective adjacent sides.

7. A fluid pressure cylinder assembly comprising a cylindrical tube, heads of circular outline and of corresponding diameter mounted on the ends of the tube, a plurality of tie rods exterior of the tube and extending axially therealong and having their ends attached to said heads, said rods having end portions which are adjacent the ends of the tube and which are spaced radially inward of the periphery of the heads, a rod spreader means on said tube spaced longitudinally inward of the heads and supporting an intermediate portion of said rods in a position tangent with a circular plane passing through said circular outlines.

8. A fluid pressure cylinder assembly comprising a cylindrical tube, a head mounted on each end of the tube, each head having at least one flat mounting face lying in a common plane, a plurality of tie rods exterior of the tube and extending axially therealong, the ends of the rods being attached to said heads, rod spreading means on said tube spaced longitudinally inward of said heads and supporting an intermediate portion of each of said rods in a position radially spaced from said cylinder tube and spaced radially outwardly of the respective ends of said rods, the intermediate portion of at least one of said rods being tangent to said plane.

9. A fluid pressure cylinder assembly comprising a cylindrical tube, a head mounted on each of the tube, a plurality of tie rods exterior of the tube and extending axially therealong, the ends of the tie rods being attached to said heads in a fixed position with the portions of said rods which are adjacent the tube ends being a fixed radial distance from the longitudinal axis of the tube, rod spreader means on said tube between said heads and supporting an intermediate portion of said rods at a radial distance from said longitudinal axis which is greater than said fixed radial distance, said spreader means having a close clearance with the tube outer diameter whereby said spreader means is easily assembled to the tube but is capable of but limited lateral displacement thereon whereby to spread said rods substantially uniformly.

10. A fluid pressure cylinder assembly comprising a cylindrical tube, a head mounted on each end of the tube, a plurality of tie rods exterior of the tube and extending axially therealong, the ends of the tie rods being attached to said heads in a fixed position, rod spreader means on said tube between said heads and supporting an intermediate portion of the rods in a position radially outward of the respective ends of said rods and radially spaced from said tube, said tube having a groove intermediate its ends into which said rod spreader means projects for locating its longitudinal position on said tube.

11. A fluid pressure cylinder assembly in accordance with claim 10 in which said spreader means comprises a plurality of members each received in said groove.

12. A fluid pressure cylinder comprising a cylindrical tube having a closure head at each end thereof, a plurality of tie rods exterior of the tube and extending axially therealong between said heads, said rods at at least one end thereof being attached to the respective head at a fixed radial distance from the longitudinal axis of said tube, rod spreader means on said tube spaced longitudinally inward from said respective head and having outwardly open notches supporting an intermediate portion of said rods in a position radially outward of said fixed ends.

13. A fluid pressure cylinder in accordance with claim 12 in which said heads project radially beyond said tube and said intermediate portion of said rods is supported in a position within the radial outline of said heads.

14. A fluid pressure cylinder in accordance with claim 12 in which both said spreader and said intermediate portions of said rods are located within the radial outline of said heads.

References Cited in the file of this patent
UNITED STATES PATENTS

| | | |
|---|---|---|
| 1,071,145 | Darlington | Aug. 26, 1913 |
| 2,378,584 | Schorer | June 19, 1945 |
| 2,716,854 | Hacker | Sept. 6, 1955 |
| 2,798,778 | Flick | July 9, 1957 |

OTHER REFERENCES

Hydraulic Cylinder Bulletin JH-104N, copyright 1958, page 28.